United States Patent [19]

Varaprasad et al.

[11] Patent Number: 5,142,407
[45] Date of Patent: Aug. 25, 1992

[54] METHOD OF REDUCING LEAKAGE CURRENT IN ELECTROCHEMICHROMIC SOLUTIONS AND SOLUTIONS BASED THEREON

[75] Inventors: Desaraju V. Varaprasad; Hamid R. Habibi; Niall R. Lynam; Padma Desaraju, all of Holland, Mich.

[73] Assignee: Donnelly Corporation, Holland, Mich.

[21] Appl. No.: 456,164

[22] Filed: Dec. 22, 1989

[51] Int. Cl.$^5$ .............................. G02B 5/23
[52] U.S. Cl. .................. 359/276; 359/275; 359/265
[58] Field of Search ........ 350/354, 350 R, 357; 359/275, 276, 265

[56] References Cited

U.S. PATENT DOCUMENTS

| | | | |
|---|---|---|---|
| 2,633,045 | 3/1953 | Sziklai | 81/179 |
| 3,280,701 | 10/1966 | Donnelly et al. | 350/357 |
| 3,282,157 | 11/1966 | Jones et al. | 350/357 |
| 3,282,158 | 11/1966 | Jones et al. | 350/357 |
| 3,282,160 | 11/1966 | Jones et al. | 350/357 |
| 3,283,656 | 11/1966 | Jones et al. | 350/357 |
| 3,451,741 | 6/1969 | Manos | 350/357 |
| 3,453,038 | 7/1969 | Kissa et al. | 350/357 |
| 3,506,229 | 4/1974 | Schoot et al. | 350/357 |
| 3,652,149 | 3/1972 | Rogers | 350/357 |
| 3,692,388 | 9/1972 | Hall, Jr. et al. | 350/312 |
| 3,774,988 | 11/1973 | Rogers | 350/390 |
| 3,873,185 | 3/1975 | Rogers | 350/390 |
| 4,090,782 | 5/1978 | Bredfeldt et al. | 350/357 |
| 4,093,358 | 6/1978 | Shattuck et al. | 350/357 |
| 4,139,276 | 2/1979 | Clecak et al. | 350/357 |
| 4,210,390 | 7/1980 | Yaguchi | 350/357 |
| 4,309,082 | 1/1982 | Kohara et al. | |
| 4,561,001 | 12/1985 | Gunn et al. | |
| 4,752,119 | 6/1988 | Ueno et al. | 350/357 |
| 4,820,025 | 4/1989 | Nakanowatari | 350/354 |
| 4,893,908 | 1/1990 | Wolf et al. | 350/357 |

FOREIGN PATENT DOCUMENTS

| | | |
|---|---|---|
| 0012419 | 6/1980 | European Pat. Off. |
| 56-93742 | 6/1981 | Japan |
| 56-93743 | 6/1981 | Japan |
| 57-208531 | 12/1982 | Japan |
| 328017 | 5/1930 | United Kingdom |

OTHER PUBLICATIONS

Shelepin et al., "Electrochromism of Organic Compounds II. Spectral and Electrochemical Examination of a System Based on Methylviologen and 5,10-Dihdyro-5,10-Dimethylphenazine," Elektrokhimiya, vol. 13 (3), 404–408 (Mar. 1977).

Ushakov et al. U.S. HAKOV: "Electrochromis of Organic Compounds: Some Properties of Two-Electrode Cells," Elektrokimiya, vol. 14 (2), 319–322 (Feb. 1978).

Hirai et al., "Electrochromism for Organic Materials in Polymeric All-Solid-State Systems," Appl. Phys. Lett., 43, (7), 704 1983.

Kaufman "New Organic Materials for Use as Transducers in Electrochromic Display Devices," Conference Record of 1978 Biennial Display Research Conference, Oct. 24–26, 1978.

Primary Examiner—William Mintel
Assistant Examiner—Roy Potter
Attorney, Agent, or Firm—Price, Heneveld, Cooper, DeWitt & Litton

[57] ABSTRACT

The specification discloses electrochemichromic solutions and devices based on the use of from about 5% by volume of a nonpolymeric material having a high volume resistivity and high dielectric constant to reduce leakage current without unduly increasing solution viscosity. In an alternative aspect, high quantities of such materials are used even though solution viscosity increases to the point of preventing room temperature vacuum backfilling in order to take advantage of other features of such solutions.

24 Claims, 1 Drawing Sheet

METHOD OF REDUCING LEAKAGE CURRENT IN ELECTROCHEMICHROMIC SOLUTIONS AND SOLUTIONS BASED THEREON

BACKGROUND OF THE INVENTION

The present invention relates to electrochemichromic solutions and devices based thereon. Such solutions are well-known and are designed to either color or clear, depending on desired application, under the influence of applied voltage.

Such devices have been suggested for use as rearview mirrors in automobiles such that in night driving conditions, application of a voltage would darken a solution contained in a cell incorporated into the mirror (U.S. Pat. No. 3,280,701, Oct. 25, 1966). Similarly, it has been suggested that windows incorporating such cells could be darkened to block out sunlight, and then allowed to lighten again at night. Electrochemichromic cells have been used as display devices and have been suggested for use as antidazzle and fog-penetrating devices in conjunction with motor vehicle headlamps (British Patent Specification 328017, May 15, 1930).

U.S. Pat. No. 4,090,782 to Bredfeldt et al., U.S. Pat. No. 4,752,119 to Ueno et al. (June, 1988), Chemical Abstract 86:196871c, 72-Electro. Chemistry, Vol. 86, 1977, I. V. Shelepin et al. in *Electrokhimya*, 13(3), 404–408 (March, 1977), O. A. Ushakov et al., *Electrokhimya*, 14(2), 319–322 (February, 1978), U.S.S.R. Patent 566863 to Shelepin (August, 1977), U.S. Pat. No. 3,451,741 to Manos, European Patent Publication 240,226 published Oct. 7, 1987 to Byker, U.S. Pat. No. 3,806,229 to Schoot et al., U.S. Pat. No. 4,093,358 to Shattuck et al., European Patent Publication 0012419 published Jun. 25, 1980 to Shattuck and U.S. Pat. No. 4,139,276 to Clecak et al. all disclose electrochemichromic solutions of anodic and cathodic electrochromically coloring components which provide self-erasing, high color contrast, single compartment cells. Such anodic and cathodic coloring components comprise redox couples selected to exhibit the following reaction:

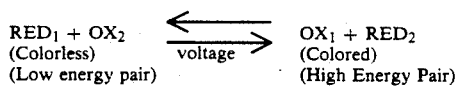

$$RED_1 + OX_2 \underset{\text{voltage}}{\rightleftharpoons} OX_1 + RED_2$$
(Colorless)     (Colored)
(Low energy pair)     (High Energy Pair)

The redox couple is selected such that the equilibrium position of the mixture thereof lies completely to the left of the equation. At rest potential, the anodically coloring reductant species $RED_1$, and the cathodically coloring oxidant species $OX_2$ are colorless. To cause a color change, voltage is applied and the normally colorless $RED_1$ is anodically oxidized to its colored antipode $OX_1$, while, simultaneously, $OX_2$ is cathodically reduced to its colored antipode, $RED_2$. These cathodic/anodic reactions occur preferentially at the electrodes which, in practical devices, are typically transparent conductive electrodes. Within the bulk of the solution, the redox potentials are such that when $RED_2$ and $OX_1$ come together, they revert to their lower energy form.

This means the applied potential need only suffice to drive the above reaction to the right. On removing the potential, the system reverts to its low energy state and the cell spontaneously self-erases.

Such redox pairs are placed in solution in an inert solvent. Typically, an electrolyte is also added. This solution is then placed into a relatively thin cell, between two conductive surfaces. In most applications, at least one of the conductive surfaces comprises a very thin layer of a transparent conductor such as indium tin oxide (ITO), doped tin oxide or doped zinc oxide deposited on a glass substrate so that the cell is transparent from at least one side. If the device is to be used in a mirror, the second surface is typically defined by a relatively thin layer of transparent conductor such as indium tin oxide, doped tin oxide or doped zinc oxide deposited on another glass substrate, which is silvered or aluminized or otherwise reflector coated on its opposite side. In the case of solar control windows, the second glass substrate would of course not be silvered on its opposite side so that when the redox pair is colorless, the window would be entirely transparent.

A wide variety of cathodically coloring species, anodically coloring species, inert current carrying electrolytes and solvent systems are described in prior art. One problem with the prior art solvent-electrolyte-redox chemical systems in electrochemichromic devices relates to leakage current. When the electrochemichromic cell is colored by the application of voltage, the colored species $OX_1$ and $RED_2$ continually want to recombine and return to their equilibrium, colorless condition. The rate of recombination of the colored species $OX_1$ and $RED_2$ within the bulk of the solution is inversely proportional to their diffusion coefficient in the solvent used. In order to counteract the tendency of the colored species to recombine and go to the colorless equilibrium state, current must continually leak into the bulk solution to compensate for recombination.

Because current must flow across the conductive surface of the transparent conductor used on at least one of the substrates that sandwich the electrochemichromic cell, and because these transparent conductors have finite sheet resistance, applied potential will be highest adjacent to the bus bar connector typically located at an edge perimeter and will be lowest near the center of the device as current passes across the conductive glass surface to color remote regions. Thus, if the leakage current is high and/or the sheet resistance of the transparent conductor is high, the potential drop that ensues across the transparent conductor itself results in a lower potential being applied to remote regions. Coloration is therefore nonuniform with the edge regions nearest the bus bar coloring deepest and the central regions coloring lightest. Such nonuniformity in coloration is commercially undesirable. For a given transparent conductor sheet resistance, the lower the leakage current the more uniform the coloration. This is an important advantage; otherwise, a thicker and hence more costly and less transparent conductive coating would be needed to reduce the sheet resistance to accommodate the higher leakage currents seen with solvents suggested in the prior art.

Yet another disadvantage of higher leakage currents is their imposition of a drain on battery-power sources in some instances. If an electrochemichromic device were used in a sunroof, for example, it would be desirable to have the sunroof colored dark while the car is parked in a parking lot. If the current leakage is too great, the operator could find that the car battery has been drained as a result of current being drawn by the colored sunroof.

The addition of thickeners such as polymethylmethacrylate (PMMA) to the solvent will reduce leakage current. It will also reduce "segregation." When first bleached after being held for a prolonged period in the colored state, bands of color are seen adjacent to the bus bar connectors to the transparent conductive electrodes that sandwich the electrochemichromic solution. One problem with adding thickeners is that the solution can become so viscous that vacuum backfilling a thin electrochemichromic cell becomes commercially unfeasible.

As a result of these drawbacks, electrochemichromic solutions and devices based thereon have not achieved the degree of commercial success which they potentially could achieve.

SUMMARY OF THE INVENTION

In the present invention, we have discovered that leakage current can be reduced without unduly increasing solution viscosity by adding to the solvent a nonpolymeric material having a volume resistivity of at least $5 \times 10^9$ ohm.cm at 25° C. and a dielectric constant greater than 15 at 25° C. and about 60 hertz. Because the materials are nonpolymeric, a substantial percentage can be added without unduly increasing solution viscosity.

In another aspect of this invention, the use of a high concentration of such materials can suppress the rate of recombination of the colored reduced and oxidized cathodic and anodic species such that the rate of self-erasure is sufficiently reduced that these electrochemichromic solutions of extremely low leakage current can be used in applications such as automotive sunroofs, automotive front windshield shade bands, large area architectural windows and variable opacity glass office partition panels previously unachievable using self-erasing electrochemichromic solutions revealed in the prior art.

In the broader aspects of this invention, such nonpolymeric, high volume resistivity and high dielectric constant materials can be used per se as the solvent, although room temperature vacuum backfilling with such a solution is often not practical. Nevertheless, such solutions offer some advantages in some situations. These and other objects, advantages and features of the invention will be more fully understood and appreciated by reference to the written specification.

DESCRIPTION OF THE PREFERRED EMBODIMENT

Figure 1:
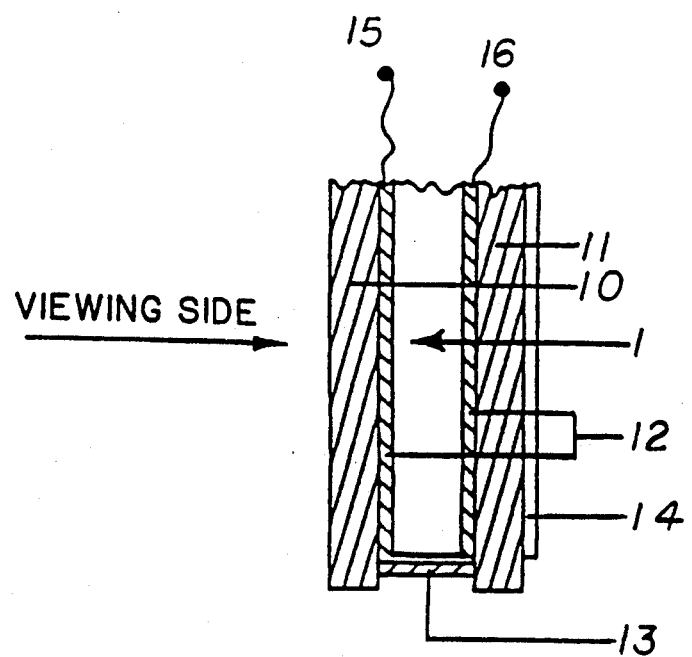
FIG. 1 is a cross-sectional view of an electrochemichromic cell.

In the preferred embodiment, the electrochemichromic solutions of the present invention include a redox chemical pair which colors in the presence of an applied voltage and which bleaches to a colorless condition in the absence of an applied voltage dissolved in a solvent which comprises at least about 5% weight by volume of a nonpolymeric additive having a high volume resistivity of at least $5 \times 10^9$ at 25° C. and a dielectric constant of at least 15 at 25° C. and about 60 hertz. Such nonpolymeric materials often find use in capacitors. Cyanoethylsucrose is one specific example of such a nonpolymeric material having high volume resistivity and required dielectric constant.

Volume resistivity is the resistance in ohms across any two opposing faces of a 1 cm $\times$ 1 cm $\times$ 1 cm cube of a given material. Its units are ohm centimeters (ohm.cm). Volume resistivity is "high" as that term is used herein when it is $5 \times 10^9$ ohm.cm or larger. The volume resistivity of cyanoethylsucrose is $5 \times 10^{11}$ ohm.cm at 25° C. This is dramatically higher than the volume resistivity of prior art solvents typically suggested for use in electrochemichromic solutions and devices:

| Propylene carbonate | $5 \times 10^7$ ohm · cm |
|---|---|
| Dimethylformamide (DMF) | $1.67 \times 10^7$ ohm · cm |
| Propionitrile | $1.17 \times 10^7$ ohm · cm |
| Acetonitrile | $1.67 \times 10^9$ ohm · cm |
| Methylethylketone | $2.78 \times 10^8$ ohm · cm |
| Ethylene carbonate | $10^7$ to $10^8$ ohm · cm |
| Acetone | $2.04 \times 10^8$ ohm · cm |

For a given substance, dielectric constant is the ratio of the capacitance of a condenser with that substance as dielectric to the capacitance of the same condenser with a vacuum as dielectric. Dielectric constant is a dimensionless quantity. It is frequency and temperature dependent. Devices of the present invention will typically be operating on direct current. As used herein, a dielectric constant is considered "high" when it is 15 or greater. The dielectric constant for cyanoethylsucrose at low frequencies (around 60 hertz as opposed to frequencies in the megahertz range) and room temperature (25° C.) is around 38. Polymethylmethacrylate has a dielectric constant of 3.6 (25° C. and 50 hertz) and a volume resistivity greater than $10^{15}$ ohm.cm at 25° C.

In an embodiment of the invention which is preferred for use in devices requiring rapid bleach times and easy fillability, e.g., rearview mirrors, from about 5 to about 90% weight by volume of a material of this invention, such as cyanoethylsucrose, is added to an electrochemichromic solvent in order to reduce leakage current in an electrochemichromic solution using such solvent. For devices where low leakage is paramount and ease of fillability and fast bleach time are not as important, e.g., windows and sunroofs, from about 90 to 500% weight by volume percent is added to the solvent. Most electrochromic solvents are operable, but one containing at least about 25% by volume 2-acetylbutyrolactone is preferred. The precise percentage weight by volume of cyanoethylsucrose which is added will vary depending on (1) the extent to which one desires to lower leakage current; (2) the extent to which one can increase the viscosity of the primary solvent without inhibiting vacuum backfilling; and (3) the extent to which the product application can accommodate the lengthening of bleach response time from a colored state to a less colored clear state that is generally concurrent with decrease in leakage current. Generally, solutions having a viscosity greater than about 100 centistokes become difficult to vacuum backfill.

Cyanoethylsucrose (CES#18304-13-7) has a high volume resistivity and a dielectric constant in excess of 15 at 25° C. and 60 hertz. Unlike thickening agents such as polymethylmethacrylate (PMMA) commonly referred to in prior art which are polymers and usually are solids, cyanoethylsucrose is a viscous to pale yellow liquid of density 1.2 and of structure:

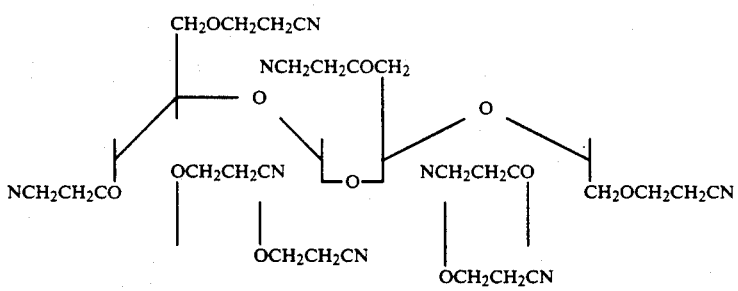

as indicated in Table 1, we found that cyanoethylsucrose had an exceptionally high solubility in the solvents of interest to electrochemichromic devices.

Cyanoethylsucrose can be added proportionally to a given electrochemichromic solvent, or mixture of solvents, so that the degree of reduction in leakage current, and thereby, the magnitude of the suppression of self-erasure and the consequent improvement in uniformity of coloration and decrease in segregation, can be customized to best suit a particular application. For smaller area windows and for mirror devices of roughly 100 to 500 cm² area or thereabouts and with the cell thickness about 150 microns, a moderate leakage current in the 2 to 6 amperes per square meter region may be tolerable and so smaller amounts of cyanoethylsucrose could be added to reduce leakage current into this range. For smaller windows and particularly for automotive rearview mirrors, it is advantageous to reduce the leakage current sufficiently to enable uniform coloration using transparent conductors of economical sheet resistance, but it may not be desirable to reduce leakage current overly such that the bleach response time is overly slow.

By contrast, large area devices such as automotive windows preferably have a leakage current of 1 ampere per square meter, or less, so that battery drain and color uniformity is acceptable. Ideally, the leakage current will be so low that, once colored and held at open circuit, such devices essentially maintain their dimmed state for long periods, i.e., hours or even days. This persistence in coloration when the powering voltage is removed is commonly referred to as memory. Also, in comparison to, for example, automotive rearview mirrors where coloration and bleaching are sufficiently frequent that segregation may not be intolerable, especially when viewed at night in a dark automobile cabin, architectural windows, glass office partitions or automotive windows and sunroofs will typically be subjected to prolonged coloration of several hours or more and, when first bleached after such long coloration, they will typically be viewed under daylight or lighted conditions such that the bands of coloration that result from segregation will be plainly visible, and thus will be cosmetically objectionable, and will be commercially impractical. For these large area electrochemichromic devices, an extremely low leakage current is most desirable, even if this results in some lengthening in the bleach response time.

The solutions of the preferred embodiment include a suitable redox pair including a cathodically coloring material and an anodically coloring material. Viologens are preferred cathodic materials for the redox pair. Methylviologen, benzylviologen and heptylviologen are all satisfactory, with a 0.025 molar solution of methylviologen being preferred. In the structural formulas set forth below, $X^-$ represents the anion of the viologen salt.

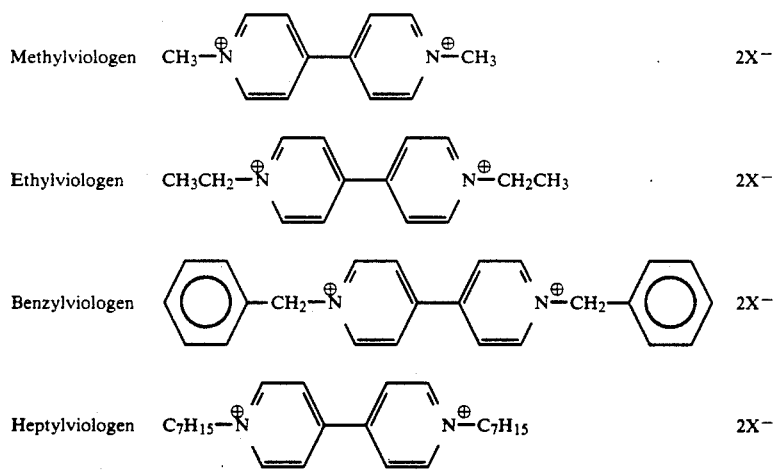

Various anions are disclosed in the literature, though we have discovered that the most preferred anions are hexafluorophosphate ($PF_6^-$), and hexafluoroarsenate. Hexafluorophosphate counter ion is listed below with other acceptable, though less preferred counter ions for use on

| the viologens: | |
|---|---|
| Tetrafluoroborate | $BF_4^-$ |
| Perchlorate | $ClO_4^-$ |
| Hexafluoroarsenate | $AsF_6^-$ |

| the viologens: | |
|---|---|
| Trifluoromethane sulfonate | $CF_3SO_3^-$ |
| Hexafluorophosphate | $PF_6^-$ |

The preferred anodic coloring materials are set forth below.

DMPA - 5,10-dihydro-5,10-dimethylphenazine    R = $CH_3$
DEPA - 5,10-dihydro-5,10-diethylphenazine    R = $C_2H_5$
DOPA - 5,10-dihydro-5,10-dioctylphenazine    R = $C_8H_{17}$

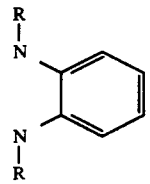

TMPD - N,N,N',N'-tetramethylphenylenediamine

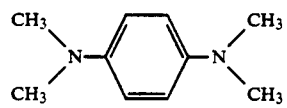

TMBZ - N,N,N',N'-tetramethylbenzidine

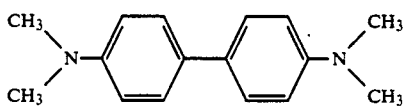

TTF - Tetrathiafulvalene

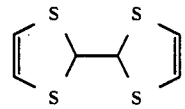

Most preferred is a 0.025 molar solution of 5,10-dihydro-5,10-dimethylphenazine (DMPA).

Numerous electrolytes can be used in the present invention. One which is often suggested for electrochemichromic cells and which is acceptable in accordance with the preferred embodiment of the invention is a tetraethylammonium perchlorate. We prefer a 0.025 molar solution. UV stabilizers such as Uvinul TM 400 and Cyasorb TM 24 at concentrations up to approximately 15% by weight can also be used in the solutions of the present invention.

The best mode electrochemichromic solutions contemplated for practicing the invention comprise a solvent combination of this invention, containing 0.02 to 0.05 and most preferably 0.025 molar methylviologen hexafluorophosphate or methylviologen perchlorate, 0.02 to 0.05 and most preferably 0.025 molar tetrabutylammonium hexafluorophosphate or tetraethylammonium perchlorate, and 0.02 to 0.05 and most preferably 0.025 molar 5,10-dihydro-5,10-dimethylphenazine.

The preferred best mode solvent combination for use in rearview mirrors or like applications requiring rapid bleach and ease of fillability comprises 5 to 90% weight by volume cyanoethylsucrose, most preferably 45%, in 2-acetylbutyrolactone. Where low leakage current is paramount, 90 to 500% weight by volume, preferably about 300%, cyanoethylsucrose is used in 2-acetylbutyrolactone.

FIG. 1 illustrates a typical electrochemichromic cell 1 into which solutions of the present invention are typically filled. Cell 1 comprises a pair of glass plates 10 and 11 each coated on its inwardly facing surface with a half wave indium tin oxide coating 12 of about 15 ohms/square sheet resistance. Plates 10 and 11 are separated by peripheral seal 13 so that the interior of the cell has a thickness of 150 microns. Cell 1 is sealed at its perimeter by peripheral seal 13. Seal 13 comprises an epoxy material, to which 150 micron diameter spacers are added, and silk-screened to a thickness of about 150 microns. Glass beads are used as spacers. As shown, cell 1 is intended to be used as a mirror, and thus the rear surface of glass plate 11 is coated with a silver reflector layer 14. If the device were used as a window, layer 14 would be deleted. The conductive indium tin oxide layers 12 are connected to electrical terminals 15 and 16 so that a voltage can be established across a solution located between plates 10 and 11 in cell 1.

To vacuum backfill cell 1, a small gap is introduced into seal 13 at some extremity corner. This acts as a fill hole. Solution can be filled through this hole and once inside the cell, the solution is contained by seal 13 between glass substrates 10 and 11. It is desirable to use a small fill hole so that the entrance orifice is small. Otherwise, it is difficult to seal the fill hole once the cell cavity is full such that no leaks occur through the fill hole. But since the fill hole is small, less than 1 mm × 1 mm × 150 microns typically, it is difficult to fill the cell cavity using a hypodermic needle or the like. Also, since there is only one fill hole, back pressure would impede complete filling through one fill hole anyway. Thus a means is needed to fill such a cell cavity that overcomes the above problems. Vacuum backfilling is such a means.

In the vacuum backfill technique, the empty cell is placed in a vacuum chamber along with a container (typically a dish or small cup) of the electrochemichromic fluid intended to be filled through the single fill hole into the cell cavity. The chamber is evacuated to a high vacuum, 1 mm Hg or better. Means are then used to lower the fill hole just under the surface of the electrochemichromic fluid. The chamber is now vented to atmospheric pressure (typically using nitrogen or similar inert gas). Atmospheric pressure forces the fluid into the cell cavity and so fills it. However, how completely it fills is a function both of the vacuum pressure upon evacuation $P_V$ and the atmospheric pressure $P_A$ to which the chamber is vented during venting.

Although a vacuum pump can evacuate a vacuum chamber to $10^{-6}$ mm Hg or better, the vapor pressure of the solvent limits how high a vacuum can be achieved. This is because the vacuum pump reduces the vacuum pressure down to the vapor pressure (at the temperature of the chamber) of the fluid used. Once the vacuum pressure equals the vapor pressure, vacuum pressure will go no lower until all the fluids have evaporated. Thus the choice of solvent, through its vapor pressure, dictates how large a bubble will remain after backfilling a given cell volume. As the device area increases such as might be encountered in window devices, the problem gets worse and, unless a sufficiently low vapor pressure solvent is chosen, or unless means such as cooling the fluid and chamber (to reduce vapor pressure) or overpressuring during backfill (to force more fluid in) are employed, a cosmetically unacceptable bubble will be left within the electrochemichromic cell. While a small bubble of about 1 mm diameter may dissolve over time, a larger bubble will not completely disappear. Further, if the viscosity of the fluid to be filled is very high, then it may be difficult to fill at room temperature. If higher filling temperatures are used, the residual bubble may be larger as the vapor pressure increases with temperature. Simple physics teaches that:

$$P_A V_A = P_V V_V \qquad (1)$$

where $P_A$ = pressure to which the chamber is finally vented.
$V_A$ = volume of gas trapped in the cell after completely filling the cell.
$P_V$ = vacuum pressure in the chamber after evacuation and prior to filling.
$V_V$ = volume of the empty cavity, i.e., cell volume.

Since undissolved gas trapped in the cell after incomplete filling will usually form a bubble, then VA can be written as:

$$V_A = \pi/4 d^2 t \qquad (2)$$

where d is the bubble diameter; and
t is the cell cavity thickness.

Also, $P_A$ is usually 760 mm Hg although it is important to stress that the chamber can be overpressured to several atmospheres or more after filling if it is desired to fill more completely. However, in the case where $P_A = 760$ mm Hg and where $A_V = A \times t$ where A is the cell area and t is the interpane thickness, we have:

$$P_V \cdot A \cdot t = 760 \cdot \pi/4 \cdot d^2 \cdot t \qquad (3)$$

which reduces to $$P_V = 5.969 d^2 / A \qquad (4)$$

where d is in mm and A is in cm$^2$ Likewise $$d = \sqrt{(P_V \times A)/5.969} \qquad (5)$$

Equation (4) expresses the relationship between the residual gas bubble diameter d (in mm) and the cell area (in cm$^2$) to the pressure in the chamber, $P_V$, prior to venting to atmosphere and thus backfilling.

Note that if two solvents or more are mixed together to form an ideal solution, the vapor pressure of the solution is simply the sum of the vapor pressures of each component. Cyanoethylsucrose has a very low vapor pressure. Thus its use with other solvents of higher vapor pressures can enhance their usefulness in electrochemichromic solutions intended to be vacuum backfilled. This is particularly important when large area devices such as 1 m$^2$ windows where the volume of cell cavity can be as large as 150 cc or thereabouts.

Another advantage of cyanoethylsucrose relative to other additives used to lower leakage current is its relatively low impact on overall solution viscosity. This advantage of using cyanoethylsucrose can be seen by comparing solutions using cyanoethylsucrose to solutions using the prior art thickener polymethylmethacrylate (PMMA). The leakage current data set forth below was determined using electrochemichromic cell 1 (FIG. 1).

The leakage current data set forth in Table 1 below was obtained by placing the various electrochemichromic solutions included in Table 1 within the 150 micron space between cell 1. Viscosity was determined using a conventional viscometer and test method. Indium-tin oxide transparent conductor coatings of 15 ohms/square sheet resistance were used on the inwardly facing surfaces of the glass substrates that sandwiched the electrochemichromic measurements. Each solution comprises 0.025 molar methylviologen perchlorate (or hexafluorophosphate) as the cathodic coloring material, 0.025 molar 5,10-dihydro-5,10-dimethylphenazine as the anodic coloring material and 0.025 molar tetraethylammonium perchlorate (or tetrabutylammonium hexafluorophosphate) as the electrolyte. The solvent was then varied in the manner set forth in column 1 in Table 1.

Column 1 in Table 1 lists the solvents and the amount of cyanoethylsucrose added. Column 2 lists the counterion used. Column 3 lists the concentration of cyanoethylsucrose added in percent weight per volume. Percent wt/vol is the weight of cyanoethylsucrose (or PMMA) in grams dissolved in 100 mls of solvent. For example, a 417.8% wt/vol solution of cyanoethylsucrose in 3-hydroxypropionitrile (HPN) is formed by adding 417.8 grams of cyanoethylsucrose to 100 mls of 3-hydroxypropionitrile. Column 4 lists the concentration of cyanoethylsucrose in % wt/wt. Percent wt/wt is the weight in grams of cyanoethylsucrose (or PMMA) dissolved in 100 grams of total solution. For example, an 80% wt/wt solution of cyanoethylsucrose in 3-hydroxypropionitrile is formed by adding 8 grams of cyanoethylsucrose to 2 grams of 3-hydroxypropionitrile. Column 5 gives the % transmission at zero applied potential as measured at the center of the window using conventional transmission measurement means including use of a standard light source (Standard Illuminant A) and a photopic detector. Column 6 is the % transmission reached when a potential of 1 volt is applied to fully color these solutions. Column 7 is the time in minutes taken for the window to self-bleach, at open circuit, from its fully colored state to a transmission equal to 90% of its range. Thus column 7 is an indication of how much coloration decreases over time when a coloring voltage is removed and the cell is left, open circuit, in its colored state. Therefore, column 7 is an indication of the effect commonly known as memory in this technology. Column 8 is the leakage current in amperes per square meter of cell area when filled into cell 1 as described above and when fully colored under 1 volt applied potential. Column 9 is the solution viscosity, in centistokes.

TABLE 1

| | Counterion | % Wt/Vol | % Wt/Wt | Clear State % T Zero Potential | Colored State % T IV Applied | Open Circuit Memory (Min.) Low To 90% Of Range | Leakage A/M$^2$ | Viscosity 25° C. Centistokes |
|---|---|---|---|---|---|---|---|---|
| PC + PMMA | ClO$_4$ | 5% | 4% | 84.7 | 15.0 | .52 | 6.44 | 6.4 |
| | ClO$_4$ | 10% | 7.8% | 82.5 | 13.3 | .55 | 5.65 | 25.3 |
| | ClO$_4$ | 15% | 11.2% | 83.7 | 11.8 | .74 | 4.37 | 131.7 |
| PC + CES | ClO$_4$ | 5% | 4% | 83.9 | 13.4 | .48 | 6.88 | 2.38 |
| | ClO$_4$ | 25% | 17.4% | 84.2 | 10.5 | .69 | 4.4 | 4.48 |
| | ClO$_4$ | 50% | 29.6% | 81.1 | 10.2 | 1.2 | 2.48 | 9.28 |
| | ClO$_4$ | 90% | 43.1% | 85.2 | 11.2 | 3.31 | 1 | 25.9 |
| | PF$_6$ | 476.2% | 80% | 85.5 | 12.8 | 24.0% T* | 0.0417 | 1645 |
| HPN + CES | ClO$_4$ | 5% | 4.6% | 82.3 | 12.4 | .58 | 6.32 | 4.1 |
| | ClO$_4$ | 25% | 19.4% | 84.1 | 11.7 | .86 | 4.21 | 6.5 |
| | ClO$_4$ | 50% | 32.5% | 82.7 | 11.6 | 1.4 | 2.54 | 11.41 |
| | ClO$_4$ | 90% | 46.4% | 82.6 | 11.2 | 2.86 | 1.27 | 26 |
| | PF$_6$ | 417.8% | 80% | 83.1 | 14.5 | 38.0% T* | 0.0741 | 7711 |
| ABL + CES | ClO$_4$ | 90% | 43.1% | 85.6 | 13.6 | 2.70 | 0.5 | 57.9 |
| | PF$_6$ | 476.2% | 80% | 85.7 | 13.3 | 24.0% T* | Microamps | 2605 |
| MGNT + CES | PF$_6$ | 3.96% | 4% | 83.4 | 15.3 | 1.06 | 2.42 | 7.6 |
| | PF$_6$ | 63.2% | 40% | 84.6 | 12.6 | 5.13 | 0.528 | 43.3 |
| | PF$_6$ | 142.8% | 60% | 84.7 | 16.0 | 78.7% T* | 0.236 | 222 |
| MS + CES | PF$_6$ | 4.97% | 4% | 84.9 | 16.0 | 2.03 | 1.37 | 11.5 |
| | PF$_6$ | 78.9% | 40% | 82.9 | 13.0 | 81.6% T* | 0.264 | 105 |
| | PF$_6$ | 180.0% | 60% | 84.3 | 11.8 | 37.9% T* | 0.056 | 583 |
| ODPN + CES | ClO$_4$ | 25% | 19.3% | 85.7 | 11.9 | 1.34 | 2.07 | 14.81 |
| | ClO$_4$ | 50% | 32.4% | 85.4 | 12.6 | 1.34 | 1.26 | 27.91 |
| | ClO$_4$ | 90% | 46.3% | 83.3 | 17.7 | 8.17 | 0.426 | 98.81 |
| | PF$_6$ | 416.67% | 80% | 84.9 | 14.5 | 25.7% T* | 0.07 | 2509 |
| HPN/ABL 50%:50% | PF$_6$ | 74.1% | 40% | 85.5 | 11.9 | 2.38 | 1.30 | 22.21 |

*% transmission reached after 15 minutes of bleach at open circuit having started at the fully colored state.
PC = Propylene Carbonate
HPN = 3-Hydroxypropionitrile
CES = Cyanoethylsucrose
PMMA = Polymethylmethacrylate-Aldrich 90,000 Average Molecular Weight Cat. No. 18,244-9; Lot No. 09409CW
ABL = 2-Acetylbutyrolactone
MGNT = 2-Methylglutaronitrile
MS = 3-Methylsulfolane
ODPN = 3,3'-Oxydipropionitrile
ClO$_4$ = Perchlorate
PF$_6$ = Hexafluorophosphate
% wt/vol = Wt (grams) of CES or PMMA dissolved in 100 mls of solvent
% wt/wt = Wt (grams) of CES or PMMA dissolved in 100 grams of total solution In Table 1, data is reported for solutions based on the solvents propylene carbonate, 3-hydroxypropionitrile, 2-acetylbutyrolactone, 2-methylglutaronitrile, 3-methylsulfolane and 3,3'-oxydipropionitrile. The propylene carbonate solution was thickened with 5, 10 and 15% weight/volume polymethylmethacrylate and with 5, 25, 50, 90 and 476.2% weight/volume cyanoethylsucrose. 3-Hydroxypropionitrile, acetylbutyrolactone, 2-methylglutaronitrile, 3-methylsulfolane and 3,3'-oxydipropionitrile, which are the subject of copending patent application Ser. No. 07/443,113 entitled HIGH PERFORMANCE ELECTROCHEMICHROMIC SOLUTIONS AND DEVICES THEREOF, were diluted with cyanoethylsucrose in the percentages indicated in Table 1.

As can be seen from the data, the use of polymethylmethacrylate does reduce leakage current. However, solution viscosity increases dramatically. Thus to reduce leakage current to 4.37 amps per square meter, one must increase the solution viscosity to 131.7 centistokes. This makes the solution so viscous that it is disadvantageous to use it in a commercial electrochemichromic cell which is vacuum backfilled.

In contrast, a comparable leakage current of 4.40 amperes per square meter can be obtained in a solution comprising propylene carbonate and 25% cyanoethylsucrose having a viscosity of only 4.48 centistokes. This striking contrast makes it possible, through the use of cyanoethylsucrose, to lower the leakage current of an electrochemichromic cell without unduly increasing its viscosity. Similar results are obtained for combinations of cyanoethylsucrose and other Table 1 solvents.

An even more dramatic reduction in leakage current can be achieved by further increasing the amount of cyanoethylsucrose added to these solvents, and solvent mixtures. We have discovered that solutions in various solvents of cyanoethylsucrose added to a high concentration of 80% weight per weight or more can be used as electrochemichromic solutions, with particular applicability to large area devices such as windows. Note that, as the amount of cyanoethylsucrose added increases, the leakage current continues to decrease. As shown in column 7, the memory of the higher concentration cyanoethylsucrose solutions is long which means that minimum power need be expended to maintain electrically at a dimly transmitting state devices fabricated with said solutions. Indeed, memory for several of these is sufficiently long for them to allow removal of the power source at least periodically once devices that utilize these particular solutions have been dimmed to a desired colored state. Because the rate of self-erasure is so well suppressed by the addition of high concentration of cyanoethylsucrose, such devices would remain dimly transmitting even when unpowered for prolonged periods.

Also, commensurate with the low leakage current, segregation performance for these solutions when colored for extended periods was excellent . . . as the amount of cyanoethylsucrose added was increased from around 4% weight per weight to about 80% weight per weight or more, devices such as windows utilizing said solutions could be colored for ever increasing periods without segregation of the respective colored cathodic and anodic species becoming evident or noticeable. Finally, pure cyanoethylsucrose which is a gel-like fluid of boiling point 180° C. and freezing point −10° C. was itself successfully used as the solvent in an electrochemichromic solution to give a device of remarkably low leakage current, which was in the microamps/square meter range.

As column 9 indicates, many of the higher cyanoethylsucrose solutions were extremely viscous which leads to great difficulty in using a vacuum backfill technique at room temperature to fill cells. However, we were able to fabricate successfully windows using vacuum backfill but only after extended degassing of the viscous solutions prior to backfill, and with slow ingress into the cell cavity during the vent to atmospheric pressure that concludes the vacuum backfill process, and with allowance of a stabilization time before removing the now vacuum backfilled cell to plug the fill hole with epoxy. This is explained in more detail in the examples.

EXAMPLE 1 (PRIOR ART POLYMER THICKENED SOLUTION)

A self-erasing electrochemichromic solution was prepared based on the prior art consisting of:
0.025M methylviologen perchlorate
0.025M 5,10-dihydro-5,10-dimethylphenazine
15% weight/volume (11.2% wt per wt) polymethylmethacrylate (90,000 average molecular weight)

dissolved in propylene carbonate (PC). 0.025M tetraethylammonium perchlorate was added as inert current carrying electrolyte. The solution was prepared under oxygen-free conditions and anhydrous argon gas was bubbled through the solution to further deoxygenate the solution. A roughly 24 cm×5 cm window cell was fabricated according to the construction shown in FIG. 1. Cell area was about 110 cm$^2$. The cell cavity was formed by silk-screening a roughly 2 mm×150 micron epoxy seal around the edge perimeter of one of the ITO transparent conductive coated glass substrates shown in FIG. 1. Sheet resistance for both substrates was about 15 ohms/square. Prior to its silk-screening, glass beads of nominal diameter 150 microns were mixed with the epoxy. Before curing the epoxy, the second ITO coated glass substrate was contacted to the epoxy seal and the now laminated construction was baked in an oven to cure the epoxy. A small gap of approximately 2 mm×1 mm×150 micron dimension had been allowed in the epoxy seal so that, upon lamination, a small fill hole was available close to one corner of the seal through which fluid could flow during the vacuum backfilling process. This prior art, PC-based solution was filled at room temperature into the cell cavity using vacuum backfilling. However, because of its relatively high viscosity of about 132 centistokes, difficulties were experienced during backfill. Being so viscous, it was difficult and lengthy to degas the solution; when vacuum was first applied, the solution frothed and it was necessary to wait about 10 minutes for the solution to degas under vacuum. Also, while venting back to inert atmosphere and with the cell fill hole submerged within the solution, solution ingress into the cell cavity was somewhat slow; it took about two minutes to fill the approximately 1.7 cc cell cavity. Finally, approximately five minutes needed to be allowed prior to removing from the vacuum oven to allow time for stabilization and pressure equilibration. Transmission at zero applied potential and measured at the center of the window was 83.7% T. When 1 volt potential was applied across the electrochemichromic solution via bus bars that were attached to the outer perimeter of the respective ITO transparent conductors that sandwiched said solution, the transmission dimmed to about 11.8% T. Leakage current was about 4.4 amperes per square meter of window area. When first bleached after two hours of prolonged coloration at 1 volt, segregation as evidenced by a deep blue band adjacent to one of the bus bars and a deep yellow/brown band adjacent to the opposite bus bars was noticeable and cosmetically objectionable.

EXAMPLE 2 (17.4% WT/WT CES IN PC)

A window cell identical to that described in Example 1 was filled using vacuum backfill with a solution consisting of:
0.025M methylviologen perchlorate
0.025M 5,10-dihydro-5,10-dimethylphenazine,
0.025M tetraethylammonium perchlorate dissolved in a 17.4% wt per wt (25% wt/vol) mixture of cyanoethylsucrose with propylene carbonate. This solution had a low viscosity, 4.48 centistokes and no difficulties were experienced during vacuum backfill. Total time required to vacuum backfill was only about five minutes which compares very favorably to the 17 minutes required to vacuum backfill the considerably more viscous solution of Example 1 into an identical cell using the identical vacuum backfill apparatus. Transmission at zero applied potential and measured at the cell center was about 84.2% T which dimmed to about 10.5% T when 1 volt potential was applied. Leakage current was about 4.4 amperes per square meter. When first bleached after two hours of prolonged coloration, segregation of the anodic and cathodic species to the respective bus bar electrodes was somewhat noticeable.

EXAMPLE 3 (80% WT/WT CES IN PC)

A window cell identical to that described in Example 1 was filled with an electrochemichromic solution of 0.025 molar methylviologen hexafluorophosphate, 0.025 molar 5,10-dihydro-5,10-dimethylphenazine, and 0.025 molar hexabutylammonium hexafluorophosphate in a propylene carbonate/cyanoethylsucrose solvent. In this case, the amount of cyanoethylsucrose added to propylene carbonate was increased to 80% wt per wt. The resulting solution was quite viscous (1645 centistokes) and vacuum backfilling, although ultimately successful, was difficult and took approximately 60 minutes to complete in the particular vacuum backfilling apparatus used. This was due to the need to allow time for the viscous solution to degas, for it to slowly fill the cell cavity and for the filled solution to stabilize within the cell cavity. Transmission at zero potential and measured at the cell center was about 85.5% T which dimmed to about 12.8% T when 1 volt potential was applied. Leakage current was about 0.04 amperes per square meter which is exceptionally low. Coloration and, in particular, bleach response times were slow; however, coloration and bleach uniformity were exceptionally uniform. Also, when first bleached after two hours prolonged coloration at 1 volt, segregation was negligible such that a window device fabricated using the electrochemichromic solution of this example would be commercially practical in applications where prolonged coloration of several hours or more is a functional requirement.

EXAMPLE 4 (Pure CES)

An electrochemichromic solution was formulated consisting of:
 0.025M methylviologen hexafluorophosphate
 0.025M 5,10-dihydro-5,10-dimethylphenazine
 0.025M tetrabutylammonium hexafluorophosphate
dissolved in pure cyanoethylsucrose. The solution was very viscous and was like molasses. It could not be vacuum backfilled at room temperature but it was possible to fill a window cell such as is described in Example 1 when vacuum backfilling was performed at 50° C. It took about 60 minutes to vacuum backfill the cell at this temperature. No voids were left in the 110 $cm^2 \times 150$ micron cell so filled. The pure-CES based solution filled into said window cell had a transmission of 82.6% T when measured at the cell center at zero applied potential. When 1 volt was applied across the cell, transmission dimmed to about 16.1% T. Coloration and bleach response rate were very slow; however, coloration and bleaching were very uniform. Also, when first bleached after prolonged coloration for 2 hours, practically no segregation was seen. Leakage current for this solution in this cell was in the microamperes per square meter range. This cell showed excellent memory with coloration being maintained for days at open circuit.

EXAMPLE 5 (PRIOR ART PC IN 14 CM × 14 CM WINDOW)

To illustrate the benefit of customizing leakage current so that coloration uniformity, low segregation, and bleach response are optimized, square windows of dimension 14 cm × 14 cm × 150 micron cell thickness were fabricated according to the construction schematically shown in FIG. 1. A window so constructed that used ITO of sheet resistance about 25 ohms/square was filled with a solution comprising:
 0.025M methylviologen perchlorate
 0.025M 5,10-dihydro-5,10-dimethylphenazine
 0.025 tetraethylammonium perchlorate in pure propylene carbonate.

Bus bars were attached around the perimeter edges and a potential of 1 volt was applied. At rest potential, the electrochemichromic window so formed was about 86% transmitting. This window colored deeply immediately adjacent to the bus bars, but did not color in the center, such that such a window would be commercially unacceptable. Also, when this window was prolonged colored at 1 volt for 15 minutes, very significant segregation of the reduced cathodic species to the one bus bar and the oxidized anodic species to the other bus bar was seen.

When another cell was filled with this solution, but this time using ITO of sheet resistance about 15 ohms/square as the transparent conductors that sandwiched the electrochemichromic solution, the center of the window still failed to dim appreciably when 1 volt was applied. The center dimmed only to about 40% T (although, as can be expected given the lower sheet resistance of ITO used, the colored region closer to the bus bar increased somewhat in area, while the central non-dimmed area proportionally decreased in size). Segregation after prolonged coloration at 1 volt for 15 minutes was improved over what was seen as described above when this solution had been used in a cell that utilized 25 ohms/square ITO but was nevertheless still significant.

EXAMPLE 6 (PC/CES IN 14 CM × 14 CM WINDOW)

By contrast, when a similar cell to that described in Example 5 was filled with equivalent electrochemichromic solution, but this time using the cyanoethylsucrose of this invention in 43.1% wt/wt in PC and using 15 ohms/square ITO, the central region dimmed appreciably (down to 23% T) and uniformly such that the window would be commercially practical. Segregation after prolonged coloration at 1 volt for 15 minutes for this PC solution with 43.1% wt/wt cyanoethylsucrose added was only slight to negligible and was demonstrably superior to the windows described above that utilized pure propylene carbonate solutions. Applications such as large area architectural and automotive windows, office partition panels, and large area mirrors become practical using the low leakage current solvents achievable by adding cyanoethylsucrose of this invention.

EXAMPLE 7 (33 CM × 33 CM LARGE AREA WINDOW)

To further illustrate the benefits of reducing leakage current, large area windows, of dimension 33 cm × 33 cm and with an interpane spacing of about 200 microns, were fabricated using the construction schematically described in FIG. 1. The ITO transparent conductors used were 8 ohms/square sheet resistance. One of these windows was filled with a prior art solution comprising:
 0.025M benzylviologen tetrafluoroborate
 0.025M 5,10-dihydro-5,10-dimethylphenazine
 0.025M tetrabutylammonium tetrafluoroborate
 15% wt/volume polymethylmethacrylate (90,000 average molecular weight)
dissolved in propylene carbonate. When filled into the 33 cm × 33 cm window described above, this prior art, polymer thickened, PC-based solution failed to color appreciably at the center of the window when 1 volt potential was applied to the ITO transparent conductors that sandwiched said electrochemichromic solution. Whereas the solution at the perimetal edges immediately adjacent to the bus bar connectors colored deeply, a large area of the central portion of this window essentially did not color; coloration was overall extremely nonuniform and such a window was commercially impractical. Also, when first bleached after prolonged coloration for 2 hours at 1 volt applied potential, very severe segregation of the reduced cathodic species and the oxidized anodic species was seen adjacent to the bus bars.

An identical 33 cm × 33 cm × 200 micron interpane thickness window was filled with an electrochemichromic solution of this invention that consisted of:
 0.025M methylviologen hexafluorophosphate
 0.025M 5,10-dihydro-5,10-dimethylphenazine
 0.025M tetrabutylammonium hexafluorophosphate
  dissolved in a 40% wt/wt mixture of cyanoethylsucrose and methylsulfolane (MS). At zero applied potential, transmission at the center of this window was 82.5% T. When 1 volt potential was applied, the window colored uniformly and reached 11.0% T close to the center when fully dimmed. Bleaching was also visibly uniform. When first bleached after 2 hours prolonged coloration at 1 volt applied potential, segregation was only slight and was not sufficiently noticeable to render such a window commercially impractical.

EXAMPLE 8 (MIXTURE OF SOLVENTS)

An electrochemichromic solution was formulated consisting of:

0.025M methylviologen hexafluorophosphate
0.025M 5,10-dihydro-5,10-dimethylphenazine
0.025M tetrabutylammonium hexafluorophosphate dissolved in a 50%:50% vol/vol mixture of 3-hydroxypropionitrile (HPN) and 2-acetylbutyrolactone (ABL) to which mixture 40% wt/wt cyanoethylsucrose had been added. When filled into a window as described in Example 1, transmission at the window center with zero applied potential was 85.5% which dimmed to 11.9% T when 1 volt potential was applied. Coloration and bleaching were uniform. Only small segregation was seen after prolonged coloration for two hours. Leakage current was about 1.3 amperes per square meter. Viscosity was about 22.2 centistokes.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows:

1. An electrochemichromic cell comprising:
    spaced plates, each having an inwardly facing conductive surface;
    an electrochemichromic solution located in said cell between said inwardly facing conductive surfaces, said solution comprising:
    a solvent;
    a redox chemical pair in solution in said solvent which colors in the presence of an applied voltage and which bleaches to a colorless condition in the absence of an applied voltage;
    said solvent comprising from at least about 5% weight by volume of a nonpolymeric material having a volume resistivity of at least $5 \times 10^9$ ohm.cm at 25° C. and dielectric constant of at least 15 at 25° C. and 60 hertz.

2. An electrochemichromic cell of claim 1 in which said solvent comprises up to about 90% weight by volume of said nonpolymeric material.

3. An electrochemichromic cell of claim 2 in which said solvent additionally comprises one of the group consisting of propylene carbonate, 3-hydroxypropionitrile, 2-acetylbutyrolactone, 3,3'-oxydipropionitrile, 3-methylsulfolane, 2-methylglutaronitrile and mixtures thereof.

4. An electrochemichromic cell of claim 1 in which said solvent comprises substantially only said nonpolymeric material.

5. An electrochemichromic cell of claim 1 in which said solvent comprises from about 90 to about 500% weight by volume of said nonpolymeric material.

6. An electrochemichromic cell comprising:
    spaced plates, each having an inwardly facing conductive surface;
    an electrochemichromic solution located in said cell between said inwardly facing conductive surfaces, said solution comprising:
    a solvent having at least about 25% by volume 2-acetylbutyrolactone;
    a redox chemical pair in solution in said solvent which colors in the presence of an applied voltage and which bleaches to a colorless condition in the absence of an applied voltage;
    said solvent comprising from at least about t5% weight by volume of a nonpolymeric material having a volume resistivity of at least $5 \times 10^9$ ohm cm at 25° C. and dielectric constant of at least 15 at 25° C. and 60 hertz.

7. The electrochemichromic solution of claim 6 in which said redox chemical pair comprises 0.02 to 0.05 molar of one of methylviologen perchlorate and methylviologen hexafluorophosphate and 0.02 to 0.05 molar 5,10-dihydro-5,10-dimethylphenazine.

8. An electrochemichromic cell comprising:
    spaced plates, each having an inwardly facing conductive surface;
    an electrochemichromic solution located in said cell between said inwardly facing conductive surfaces, said solution comprising:
    a solvent;
    a redox chemical pair comprising 0.02 to 0.05 molar of one of methylviologen perchlorate and methylviologen hexafluorophosphate and 0.02 to 0.05 molar 5,10-dihydro-5,10-dimethylphenazine in solution in said solvent which colors in the presence of an applied voltage and which bleaches to a colorless condition in the absence of an applied voltage;
    said solvent comprising from at least about 5% weight by volume of a nonpolymeric material having a volume resistivity of at least $5 \times 10^9$ ohm cm at 25° C. and dielectric constant of at least 15° to 25° C. and 60 hertz.

9. An electrochemichromic cell comprising:
    spaced plates, each having an inwardly facing conductive surface;
    an electrochemichromic solution located in said cell between said inwardly facing conductive surfaces, said solution comprising:
    a solvent;
    a redox chemical pair in solution in said solvent which colors in the presence of an applied voltage and which bleaches to a colorless condition in the absence of an applied voltage;
    said solvent comprising from at least about 5% weight by volume cyanoethylsucrose.

10. The cell of claim 9 in which said solvent comprises up to about 90% weight by volume cyanoethylsucrose.

11. The cell of claim 10 in which said solvent additionally comprises one of the group consisting of propylene carbonate, 3-hydroxypropionitrile, 2-acetylbutyrolactone, 3,3'-oxydipropionitrile, 3-methylsulfolane, 2-methylglutaronitrile and mixtures thereof.

12. The cell of claim 9 in which said solvent comprises substantially only cyanoethylsucrose.

13. The cell of claim 9 in which said solvent comprises from about 90% to about 500% weight by volume cyanoethylsucrose.

14. The electrochemichromic solution of claim 9 in which said solvent comprises at least about 25% by volume 2-acetylbutyrolactone.

15. The electrochemichromic solution of claim 14 in which said redox chemical pair comprises 0.02 to 0.05 molar of one of methylviologen perchlorate and methylviologen hexafluorophosphate and 0.02 to 0.05 molar 5,10-dihydro-5,10-dimethylphenazine.

16. The electrochemichromic solution of claim 9 in which said redox chemical pair comprises 0.02 to 0.05 molar of one of methylviologen perchlorate and methylviologen hexafluorophosphate and 0.02 to 0.05 molar 5,10-dihydro-5,10-dimethylphenazine.

17. A method for reducing leakage current in an electrochemichromic solution which comprises a solvent, a redox chemical pair in solution in said solvent which colors in the presence of an applied voltage and which bleaches to a colorless condition in the absence of an applied voltage, said method comprising:
introducing at least about 5% weight by volume cyanoethylsucrose into said solvent.

18. The method of claim 17 in which said solvent comprises up to about 90% weight by volume cyanoethylsucrose.

19. The method of claim 18 in which said solvent additionally comprises one of the group consisting of propylene carbonate, 3-hydroxypropionitrile, 2-acetylbutyrolactone, 3,3'-oxydipropionitrile, 3-methylsulfolane, 2-methylglutaronitrile and mixtures thereof.

20. The method of claim 17 in which said solvent comprises substantially only cyanoethylsucrose.

21. The method of claim 16 in which said solvent comprises from about 90% to about 500% weight by volume cyanoethylsucrose.

22. The electrochemichromic solution of claim 17 in which said solvent comprises at least about 25% by volume 2-acetylbutyrolactone.

23. The electrochemichromic solution of claim 22 in which said redox chemical pair comprises 0.02 to 0.05 molar of one of methylviologen perchlorate and methylviologen hexafluorophosphate and 0.02 to 0.05 molar 5,10-dihydro-5,10-dimethylphenazine.

24. The electrochemichromic solution of claim 19 in which said redox chemical pair comprises 0.02 to 0.05 molar of one of methylviologen perchlorate and methylviologen hexafluorophosphate and 0.02 to 0.05 molar 5,10-dihydro-5,10-dimethylphenazine.

* * * * *

UNITED STATES PATENT AND TRADEMARK OFFICE
CERTIFICATE OF CORRECTION

PATENT NO. : 5,142,407

DATED : August 25, 1992

INVENTOR(S) : Varaprasad et al.

It is certified that error appears in the above-identified patent and that said Letters Patent is hereby corrected as shown below:

Column 7, (between 2nd and 3rd formula):
   Insert --Npt--.

Column 9, line 38:
   "VA" should be --$V_A$--.

Column 9, line 49:
   "$A_V$" should be --$V_V$--.

Column 10, line 26:
   After "electrochemichromic" insert --solution. The window area in cell 1 was about 110 $cm^2$ for these--.

Column 18, line 5, claim 6:
   "+5%" should be --5%--.

Column 18, line 33, claim 8:
   "15° to 25°" should be --15 to 25°--.

Signed and Sealed this

Eighth Day of August, 1995

*Attest:*

BRUCE LEHMAN

*Attesting Officer*  *Commissioner of Patents and Trademarks*